Oct. 18, 1966          M. LANDERS                3,279,422
                       ICING MACHINE

Filed Aug. 1, 1963                          4 Sheets-Sheet 1

INVENTOR.
MANFRED LANDERS

BY Blum, Moscovitz,
Friedman, Blum & Kaplan
ATTORNEYS

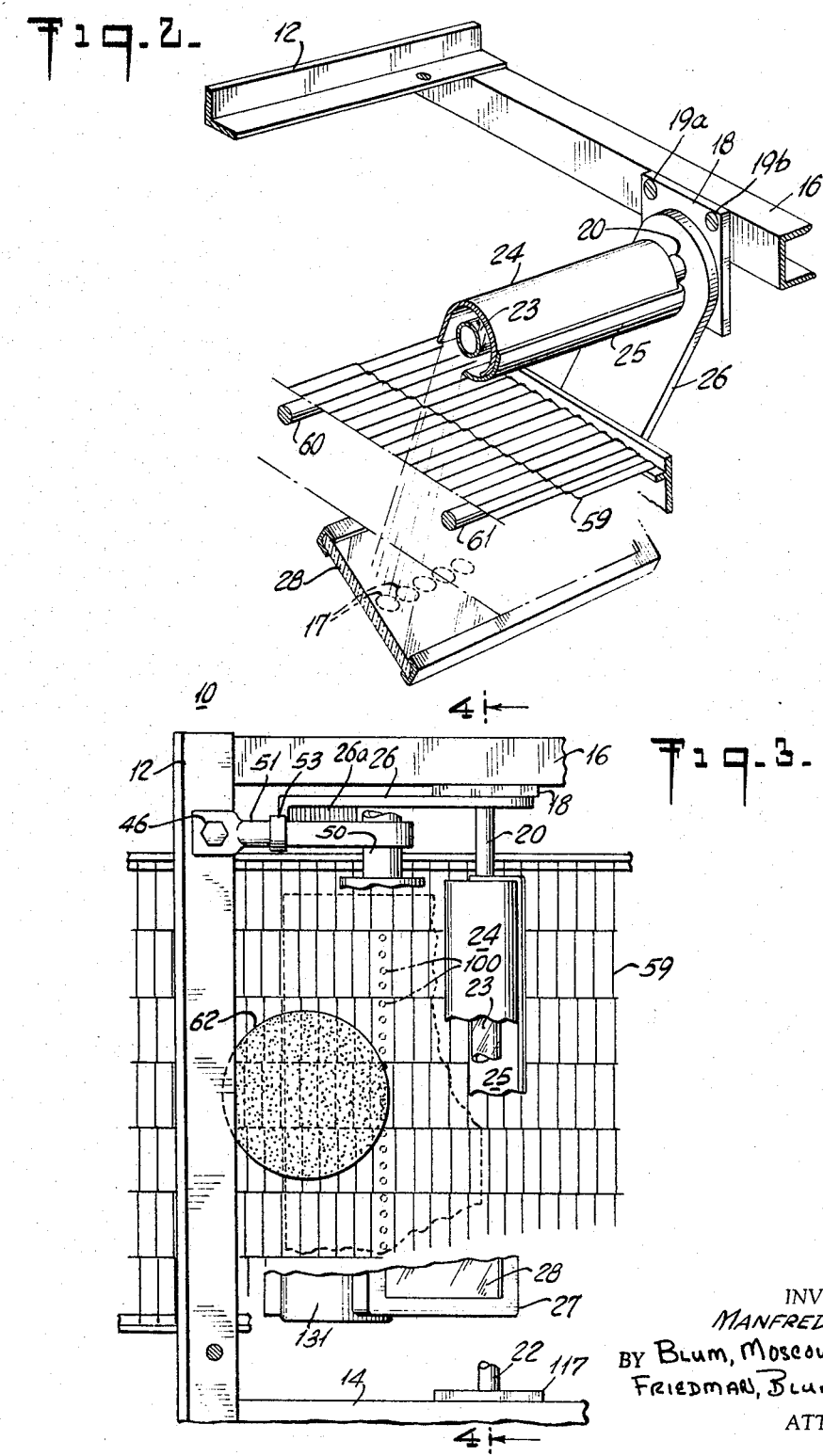

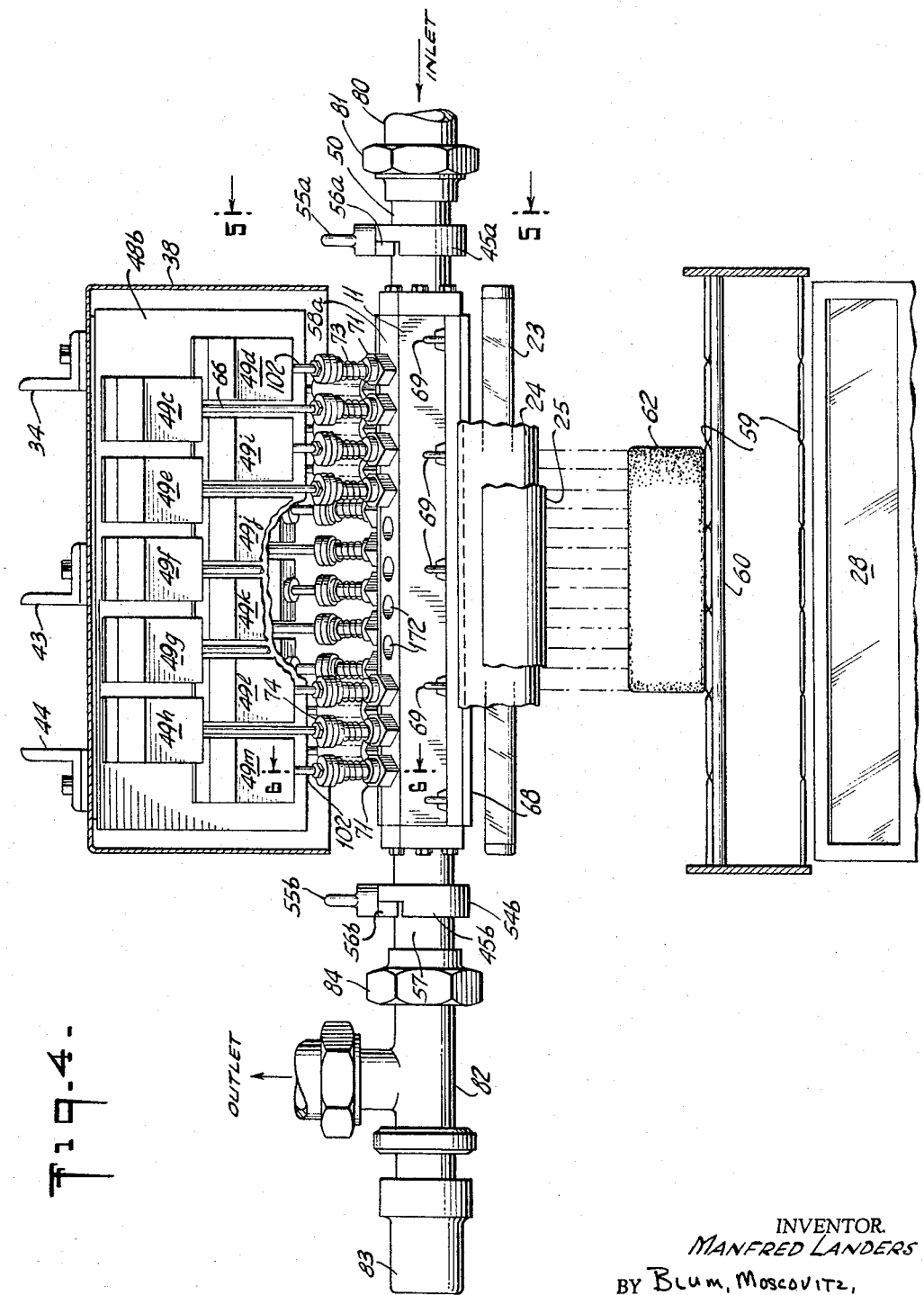

Oct. 18, 1966   M. LANDERS   3,279,422
ICING MACHINE
Filed Aug. 1, 1963   4 Sheets-Sheet 4
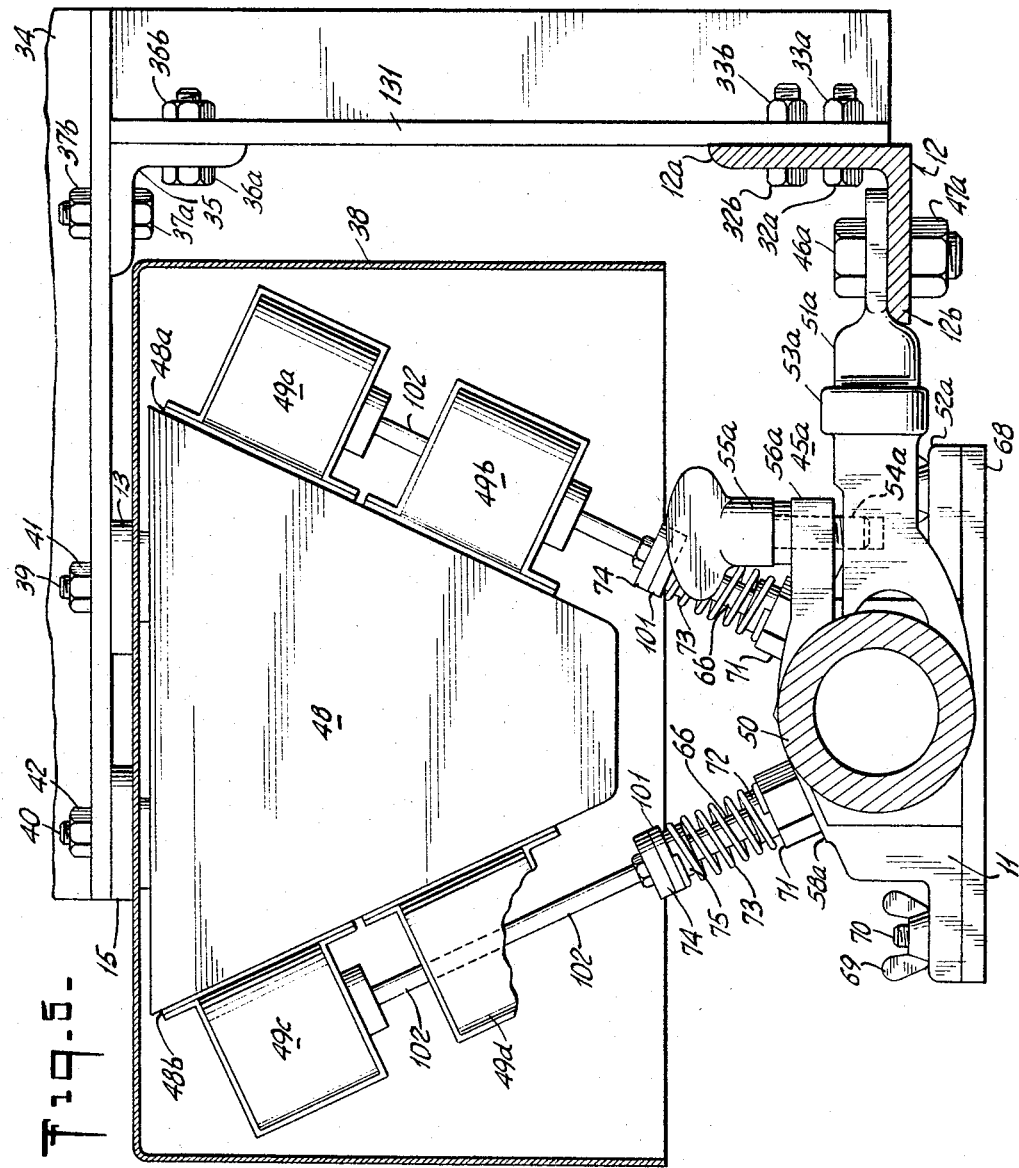
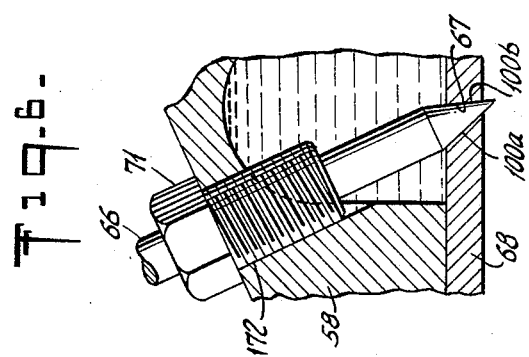
INVENTOR.
MANFRED LANDERS
BY Blum, Moscovitz,
Friedman, Blum
& Kaplan   ATTORNEYS United States Patent Office 3,279,422
Patented Oct. 18, 1966

3,279,422
ICING MACHINE
Manfred Landers, New York, N.Y., assignor to Sucrest Corporation, New York, N.Y., a corporation of New York
Filed Aug. 1, 1963, Ser. No. 299,395
6 Claims. (Cl. 118—2)

This invention relates generally to improvements in a device for applying a fluid, such as icing or syrup, on pasty goods or similar articles and more particularly to a device which utilizes photoelectric cells to control the ports dispensing the fluid.

It is incumbent upon devices which apply icing or similar substances to pastries to open the ports, or apertures, which emit the icing when the pastry or cake, is beneath a particular port and to close the ports when there is no pastry beneath the particular aperture. If the ports were opened before or after the pastry passed there-beneath, the fluid would run over and down the sides of the pastry container. This would require each container to be individually cleaned before the pastry could be offered for sale and concomitantly a great deal of fluid would be wasted. Thus, if the pastry is, for example, circular, it is obvious that those ports near the center of the cake will have to be opened before the apertures near the outer edges of the cake to properly dispense the fluid so it matches the contours of the pastry. Likewise, those ports near the center of the cake will have to close later than the ports near the outer edges of the cake. Devices which have heretofore been utilized to achieve the proper timing intervals in selectively opening and closing the various ports to impart the desired pattern to the fluid include a rotatable member lying within the valve assembly and having a predetermined shape. As the cake, or pastry moves beneath the ports (usually by means of a conveyor belt) a switch is tripped which causes the member within the valve assembly to begin to rotate. Because of the predetermined shape of this rotatable member those ports near the center of the circular pastry will open first and close last whereas those ports near the outer edges of the pastry will open later and close earlier. While this type of prior art arrangement does prevent the fluid from running over and down the cake container, it places a severe limitation upon the shape of the pastries to be iced. That is, if the fluid is to be applied to a pastry having a shape other than circular, a differently shaped rotatable member will have to be used. Hence, this type of system does not lend itself to be easily adapted to apply the fluid to differently shaped goods.

Other types of systems utilize a photoelectric cell wherein the controlling light beam and cell combination is placed transverse to the path of travel of the pastry. When the leading edge of the pastry intercepts the light beam the cell causes all the fluid dispensing ports to open. When the goods which are to be iced pass the light beam the photocell causes all the ports to be closed. Thus, it is obvious that the fluid will run over the cake container in this type of arrangement since the shape of the pastry is not taken into consideration when the valves are operated.

Accordingly, it is a primary object of the present invention to provide a device which is readily adaptable to produce a desired pattern of icing on any shaped pastry without having the icing run over the pastry container.

Another object of the present invention is to provide a device which accomplishes the above result in a highly reliable and economical manner.

In accordance with the present invention, a preferred embodiment thereof comprises a plurality of photoelectirc cells which extend in a lateral line beneath a linked conveyer belt. The belt is constructed to allow light rays to pass therethrough. A light source above the conveyor belt energizes the photoelectric cells. The plurality of ports which dispense the icing likewise lie in a laterally extending line above the conveyer belt substantially over the cells and each port is operated by a respective solenoid. Ideally, a different cell lies in the plane of a respective port and this cell actuates the solenoid controlling this respective port. As the conveyer belt moves the pastry beneath the ports, or apertures, the pastry intercepts the light rays which would otherwise impinge upon the cells. Thus, if the pastry is circular, the light rays which impinge upon the center photoelectric cells will be the first to be blocked out by the pastry. These cells will thereupon de-energize their respective solenoids to cause the center apertures to open. As the conveyer belt carries the pastry further, the pastry will block out the light rays to other cells. These other cells will in turn cause their associated solenoids to de-energize thereby causing the other apertures to open. As the pastry travels past the ports and the cells, the light rays will again impinge upon the photoelectric cells. Thus, the respective solenoids will again become energized to cause the ports to close. Since each port is individually controlled by a separate cell, the present invention is readily adaptable to dispense the fluid to any shape of pastry without having the fluid run over the pastry container. Also, there is a minimum of waste of the icing, or fluid.

It is a feature of the present invention to provide a device which produces a desired pattern of icing, or similar substance, on a pastry wherein the ports which emit the icing are individually controlled by respective photoelectric cells.

It is highly desirable to control the distance between the leading edge of the pastry and the point where the icing begins and the distance between the trailing edge of the pastry and the point where the icing ends. Hence, it is a further feature of the present invention to provide shutters on both the light source and on the photocell assembly to determine how wide the effective beam of light is to be, thereby allowing the operator to have complete control over the aforementioned distances.

The above and other objects and features of the present invention will become more apparent from a consideration of the following detailed description when taken in conjunction with the drawings in which:

FIG. 2 is a partial perspective view of the illuminating portion of the invention shown in FIG. 1;

FIG. 3 is a plan view, with parts broken away, of portions of the invention shown in FIG. 1;

FIG. 4 is a vertical section taken along the line 4—4 of FIG. 3;

FIG. 5 is a vertical section taken along the line 5—5 of FIG. 4;

FIG. 6 is a vertical section taken along the line 6—6 of FIG. 4; and

Figure 1:
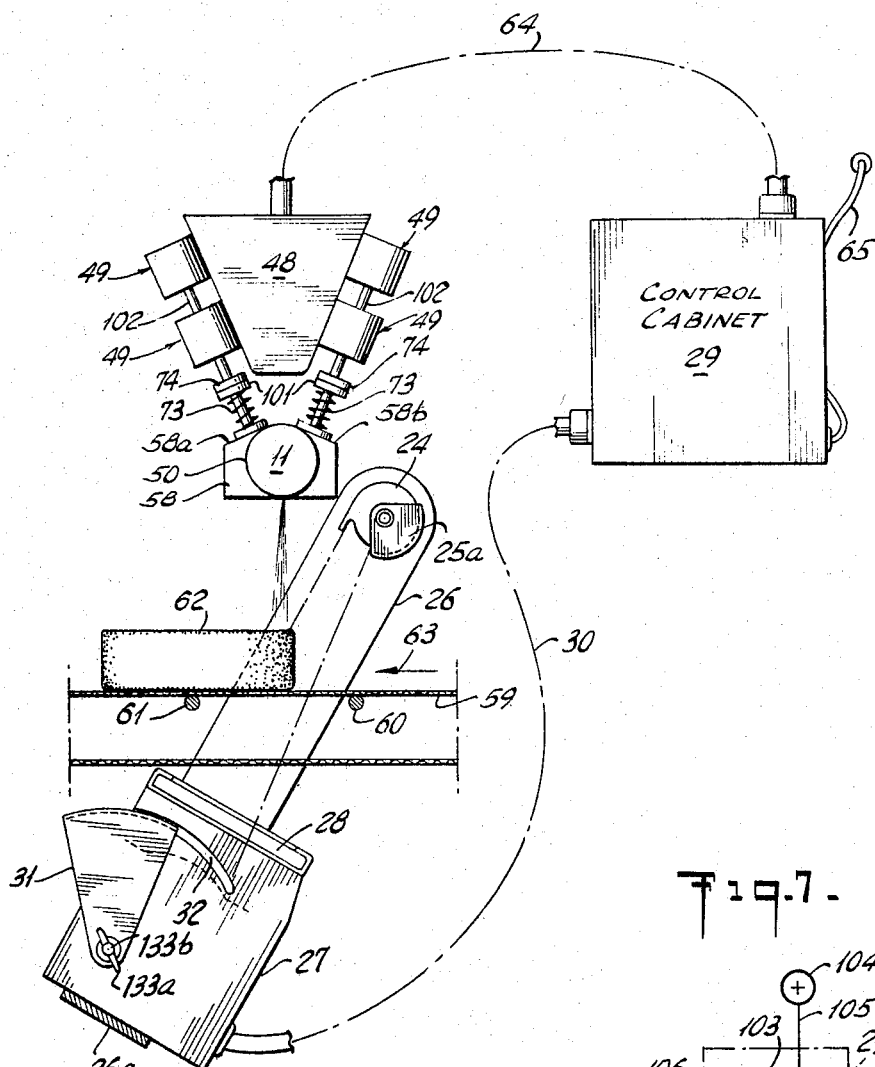
FIG. 1 is a partial diagrammatic side elevation of a pastry conveyer utilizing the device of the present invention.

A preferred embodiment of the present invention comprises apparatus which includes a suitable frame structure indicated generally as 10 (FIG. 3) which includes a laterally extending angle 12 and longitudinally extending channel arms 14 and 16. A plate 18 (FIG. 2) is connected to the vertical web of arm 16 by screws 19a and 19b, respectively. Plate 18 contains an aperture therein (not shown) to receive a shaft 20. Similarly, a plate 117 is connected to the vertical web of channel arm 14 and receives a shaft 22 therein (FIG. 3). The other ends of shafts 20 and 22 terminate in sockets (not shown) which receive a lamp 23. These shafts may be hollow to accommodate the leads (not shown) which connect the sockets to a source of power. An adjustable shade 24 partially surrounds lamp 23 and reflects the light from the lamp in a downward direction. A reflector 25, having side portions 25a (one of which is shown in FIG. 1) is pivotally mounted on the shafts 20 and 22 with the respective shafts passing through suitable apertures in side portions 25a. Reflector 25 may be secured in place in any conventional manner, such as by a set screw or frictional engagement with the shafts.

An arm 26 is journalled on shaft 20 and supports the photoelectric cell housing 27 (FIG. 1). Thus, as shown in FIG. 1, the laterally extending bottom portion 26a of arm 26 is connected to the bottom of housing 27. The housing 27 comprises a transparent splatter shield 28 affixed to the upper portion thereof. Located within the housing and extending laterally therein are a plurality of photoelectric cells indicated generally as 17 in FIG. 2. Each cell is connected to a control cabinet 29 by individual leads in a cable 30. A shutter 131, having substantially V shaped sides, is rotatably secured to housing 27 and is moveable in a slot 32. Thus, an aperture at the apex of the V shaped side is engaged by a threaded shaft 133b extending from housing 27. The rotation of shutter 131 will cause selective portions of the photocells within housing 27 to be covered, as explained hereinbelow. Shutter 131 is affixed in position by turning the threaded wing nut 33a on shaft 133b until the bottom portion of the wing nut abuts shutter 131.

The valve assembly of the present invention comprises a fluid dispensing portion 11 and a solenoid control portion located within a housing 38. The solenoid housing portion 38 is supported by a plurality of angles. One of the angles (31) is illustrated in FIG. 5. The rear flange of 31 is rigidly connected to the rear flange 12a of angle 12 by means of bolts 32a and 32b passing through suitable apertures in flange 12a and angles 31 and being secured in place by nuts 33a and 33b, respectively. The upper end of angle 31 is connected, in any suitable manner, to an angle 34. As a further support, one leg of a brace 35 is secured to the upper end of angle 31 by a bolt 36a and a nut 36b; the other leg of brace 35 is secured to angle 34 by a bolt 37a and a nut 37b. Angle 34 extends longitudinally from angle 31 and secures solenoid housing 38 in place. That is, the threaded shafts 39 and 40 extending from housing 38 pass through suitable apertures in angle 34 and are engaged by the nuts 41 and 42, respectively. The washers 13 and 15 are interposed between the top portion of housing 38 and the bottom portion of angle 34. Similarly, angles 43 and 44 (FIG. 4) support other points on the housing 38 and are secured to the rear flange of angle 12 in the same manner as angle 34.

The fluid dispensing portion 11 of the apparatus is supported by the respective clamps 45a and 45b (FIG. 4) which are in turn affixed to angle 12. The clamp portion 45a is shown in detail in FIG. 5 and comprises, in part, a portion 51a which has a thread at one end thereof and an aperture at the other end. Portion 51a is affixed to the horizontal flange 12b of angle 12 by a bolt 46a passing through the aperture in portion 51a and a suitable aperture in flange 12b and secured thereto by a nut 47a. The front portion 52a of clamp 45a has a threaded collar 53a at one end to threadably engage the threaded end of portion 51a, and a semi-circular arrangement at the other end to receive a pipe 50 (which serves as the fluid intake for fluid dispensing portion 11). The top portion 56a of clamp 45a has a semi-circular arrangement at one end and a hole at the other end through which butterfly screw 55a passes through. Screw 55a passes through hole 56a and screws into a tapped hole 54a in lower portion 52a. Screw 55a is turned until the lower face of the butterfly portion abuts the top edge of portion 56a. When this occurs pipe 50 will be clamped between portions 56a and 52a. Likewise, pipe 57 serves as the outlet for fluid dispensing portion 11 and is similarly clamped in place by a clamp 45b (FIG. 4). Pipes 50 and 57 may be connected to fluid dispensing portion 11 in any suitable manner.

The structural arrangement and its relationship to the conveyer operation is illustrated in FIG. 1 An endless conveyer belt 59, which passes over the rollers 60 and 61 (FIG. 2) carries the pastry 62 (which is to be iced) beneath fluid dispensing portion 11 in the direction indicated by the arrow 63. In a preferred embodiment the conveyer belt may comprise a series of spaced, parallel longitudinal links. However, the invention is not to be thought of as being limited to this particular type of conveyer belt since any type of conveying apparatus which will allow light rays to pass therethrough will be appropriate. The apparatus is so positioned that the conveyer belt extends between the U shaped portion comprising lamp 23 (and associated shade 24 and shutter 25), leg 26 and photoelectric cell housing 27. In this position the valve assembly will be directly above the conveyer belt as illustrated in FIGS. 1 and 3.

Having discussed the general structural arrangement of the apparatus of the present invention, the various portions comprising the apparatus will be discussed more particularly.

The fluid dispensing portion 11 comprises a hollow portion 58 having sloping top surfaces 58a and 58b and a bottom wall 68. Each of the surfaces 58a and 58b has a plurality of equally laterally spaced, aligned holes 172 (FIG. 4) tapped therein to receive the threaded bushings 71 (FIG. 6).

The bottom wall 68 of hollow portion 58 is removable (for cleaning purposes) and is secured in place by the wing nuts 69 threadably engaging the threaded shafts 70 which extend from bottom wall 68. In the present embodiment, bottom wall 68 contains many laterally spaced, aligned apertures, or ports (denoted generally as 100 in FIG. 3) through which the fluid flows onto the pastry. As illustrated in FIG. 6 the apertures have sloping side walls 100a and 100b at an angle such that the extension of the side walls would meet to form the apex of a V. Each of the ports 100 is closed by a different shaft 66, having the beveled shaped portion 67 at the end thereof, seating itself in the respective port. The beveled portion 67 may be longer than the thickness of bottom wall 68 so a part of beveled portion 67 will protrude beyond wall 68 when the port is closed. Shafts 66 are maintained in alignment by the threaded bushings 71.

As noted above, a different shaft is associated with each aperture 100 and each shaft terminates in a collar 101 having a flat cylindrical end and a spring seat 75. As illustrated clearly in FIG. 5, bushing 71 has an upwardly protruding portion 72 thereon. The top surface of bushing 71 and portion 72 form a seat for a compression spring 73, the other seat being formed by protrusion 75 and the lower surface of collar 101. Collar 101 is separated from bushing 71 by a distance such that when no external forces are present the action of spring 73 will force the associated shaft 66 up thereby moving portion 67 out of engagement with walls 100a and 100b to open the respective port and allow the fluid to flow onto the pastry.

A different shaft 102 is in alignment with a respective shaft 66 and terminates, at one end, in a flat cylindrical collar 74 and at the other end in an associated solenoid. As illustrated in FIG. 5, the collars 101 and 74 abut one another so any vertical movement of the shafts 102 will be transmitted to the respective shaft 66. The collars 74 and 101 may be affixed to the respective shaft in any conventional manner. Thus, the ends of the shafts 102 and 66 may be threaded to be received in threaded apertures in the collars 74 and 101, respectively. Each lateral wall of a support 48, located within housing 38 and affixed to threaded shafts 39 and 40, supports a number of solenoids thereon. That is, rear lateral wall 48a supports solenoids 49a and 49b (FIG. 5) and front lateral wall 48b supports solenoids 49c and 49d. To conserve space the solenoids may be affixed to the walls (in any convenient manner) in two rows, one above the other. Thus, as illustrated in FIG. 4, solenoids 49c, 49e, 49f, 49g and 49h are mounted laterally across the upper portion of wall 48b and respectively alternate with the solenoids 49d, 49i, 49j, 49k, 49l and 49m, which are mounted laterally across the bottom of wall 48b. As further illustrated in FIG. 4, each of the solenoids 49c–49m is associated with a different one of shafts 102. Thus, each solenoid, in effect, controls the operation of a different port. When a particular solenoid is energized, in the manner indicated below, it will force its associated shaft down thereby causing beveled portion 67 to seat in the respective aperture to close the port.

The port controlling shafts are made in two portions (66 and 102) to facilitate cleaning of the apparatus.

Thus, when it is desired to clean fluid dispensing portion 11 pipes 80 and 82 are disconnected, as noted hereinbelow, and clamps 45a and 45b are loosened thereby allowing the whole fluid dispensing portion 11 to be removed from the apparatus. Portion 11 may then be submersed in water.

Figure 7:
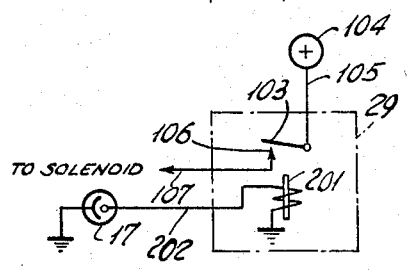
FIG. 7 is a schematic circuit diagram illustrating a control circuit in the device of the present invention.

The solenoids are connected to control cabinet 29 by individual leads in cable 64. Control cabinet 29 is connected to a source of power (not shown) by a cable 65. Each cell 17 in housing 27 individually controls the operation of one solenoid. FIG. 7 illustrates one example of how a cell may control the operation of a solenoid. Thus, cell 17 is connected between a relay winding 201 in control cabinet 29 (shown by the dotted lines), by a lead 202, and ground. The armature 103 of the relay is connected to a source of power 104 by a lead 105. Contact 106 is connected to the desired solenoid (not shown in FIG. 7) by a lead 107. When cell 17 produces a current, relay winding 201 will be energized to connect armature 103 to contact 106. Thus, a circuit will be completed from source 104 to the respective solenoid to thereby energize the solenoid.

In operation, the apparatus of the present invention may be mounted on a moveable table to facilitate movement of the complete system. Initially, the apertures 100 are aligned with the photocells in such a manner that the photocell 17 which controls the operation of a particular aperture (through the energization of the respective solenoid) will lie in the same plane as that aperture. This operation may be done when the unit is first assembled, prior to clamps 45a and 45b being tightened so the operator need not concern himself with it. Moreover, since the distance between the lamp 23 and the photocells is fixed by the length of leg 26, the photocells may be prefocused when the unit is assembled.

As noted hereinabove, the unit is placed in such a position that the lamp 23 and the photoelectric cells extend laterally with the conveyer belt 59 therebetween. In this position the apertures 100 in the fluid dispensing portion 11 of the valve assembly will be aligned transvers to the direction of travel 63 of belt 59.

The fluid which is to be applied to the pastry may be supplied, under pressure, from a device such as a tank (not shown) through a connecting pipe 80 (FIG. 4). A threaded collar 81 on the end of feed pipe 50 will engage a threaded end portion on pipe 80 to secure the connection between these pipes. Similarly, pipe 57 may be connected to a return pipe 82 (which returns the unused fluid back to the tank), which has a pressure relief valve 83 at the end thereof, by collar 84. Thus, the amount of pressure in fluid dispensing portion 11 may be controlled by rotating valve 83 in the proper direction to either decrease or increase the amount of pressure required for valve 83 to open.

As noted above, the photocell housing 27 is moveable with respect to lamp 23 since the connecting portion 26 is journalled on shaft 20. Thus, housing 27 may be tilted. When the degree of tilt is decided upon the apparatus may be fixed in this position by any method well-known in the art such as a set screw.

With the apparatus of the present invention in place and connected to a source of power the light beam from lamp 23 will impinge upon the photocells. In the conventional manner, the photocells will produce an electric current which will energize the associated solenoid windings as noted hereinabove. The energized solenoid windings will cause the beveled portions 67 of the associated shafts to seat in the respective aperture 100 thereby sealing the apertures to prevent the dispensing of the fluid from hollow portion 58. When the conveyer apparatus 59 is operated, the pastries will begin to travel in the direction indicated by arrow 63. As the leading edge of the pastry begins to intercept the beam of light from lamp 23, the light which had heretofore impinged upon the particular photocells will now be locked out. Thus, these photocells will cease producing current thereby deenergizing the associated solenoid. The action of the springs 73 associated with the de-energized solenoids will cause the respective shafts 66 to move upward thereby opening the respective apertures in bottom wall 68 to allow the fluid to flow out at these particular points. As the pastry 62 continues moving beneath the ports 100 and the light beam from lamp 23, the pastry will block out the light rays to other photocells in the assembly. These photocells will, in turn, de-energize their respective solenoids thereby causing beveled portion 67 of their associated shafts 66 to move out of seating relationship with walls 100a and 100b in bottom wall 68. As the pastry continues its movement and the larger portion of the pastry passes from beneath the ports, the light which had formerly been blocked by the pastry will now impinge upon respective photocells to again energize the solenoids and cause the associated ports to close.

Moveable shutter 25, which surrounds lamp 23, may be rotated to adjust the distance between the leading edge of the pastry and the point at which the fluid begins to coat the upper surface of pastry 62. Thus, by rotating shutter 25 in a clockwise direction (as taken in FIG. 1) the effective width of the beam of light is made smaller. Therefore, the distance which the leading edge of pastry 62 will have to travel past the apertures 100 before it completely blocks out the light impinging upon the photocells will be shorter. Hence, the fluid will begin to coat the surface of the pastry at a point closer to the leading edge. On the other hand, if it is desired to begin the coating at a point further from the leading edge of pastry 62, shutter 25 may be rotated in a counter-clockwise direction thereby widening the effective beam of light from tube 23.

As noted hereinabove, shutter 131 on photocell housing 27 may be adjusted to control the distance between the point the fluid coating ends and the trailing edge of the pastry. By loosening wing nut 33 and rotating shutter 131 in a clockwise direction (as taken in FIG. 1), the effective width of the beam of light as seen by the photocells will be lessened. Thus, pastry 62 will have to travel a greater distance beneath apertures 100, in bottom wall 68, before the light beam again impinges upon the photocells (to cause the beveled portion 67 of the shafts 66 to again seat in the particular aperture). Hence, the distance between the trailing edge of the pastry and the point at which the coating stops will be lessened. On the other hand, if it is desired to lengthen the distance between the fluid and the trailing edge of the cake, shutter 31 may be rotated in a counter-clockwise direction. When the position of shutter 31 relative to the photocells has been determined, the shutter may be affixed in place by tightening wing nut 33. Since the operation of each of the apertures, or ports 100 is controlled by a different photocell, it is seen that the present invention provides a device which is readily adaptable to apply a fluid to coat a pastry of any shape without having the fluid run over the pastry container. As an attendant advantage, since the fluid is not applied to the container, there is a minimum of waste of the fluid associated with the present device.

Having described a preferred embodiment of the present invention it will become obvious to those skilled in the art that modifications may be made thereon without departing from the spirit of the invention. Therefore, I wish only to be limited by the scope of the appended claims.

What is claimed is:

1. Apparatus for applying fluid to pastry and the like, comprising a longitudinally extending and moving light transmitting conveyer for conveying said pastry thereon, a frame having lateral arms respectively above and below said conveyer, a plurality of laterally spaced photoelectric cells on one arm opposite the path of movement of said pastry, a light source on the other arm, each photoelectric cell receiving and activated by light from said light source except when said pastry interrupts light to said photoelectric cell to thereby detect the presence and shape of said pastry, fluid dispensing means disposed above said conveyer adjacent the path of light and operative to apply fluid to said pastry concurrently with said detection of said pastry, said fluid dispensing means having laterally spaced bottom fluid outlet ports in one to one correspondence to said photoelectric cells, each port overlying and substantially vertically aligned with its corresponding photoelectric cell, an individual valve for each port moveable between port opening and port closing positions, and electro-mechanical means coupling each photoelectric cell and valve of its corresponding port for moving said valve to port opening position when light to said photoelectric cell is interrupted by said pastry and to port closing position when the position of said pastry permits said photoelectric cell to receive light.

2. Apparatus for dispensing fluid on pastries comprising, in combination, a valve assembly, a light transmitting conveyer means for conveying the pastries in a longitudinal path below said valve assembly, said valve assembly comprising a hollow pipe having a plurality of laterally spaced ports in the bottom wall thereof, a plurality of laterally spaced photoelectric cells in one to one correspondence with said plurality of ports, means for mounting said plurality of photoelectric cells laterally below said conveyer means and transverse to said path whereby each photoelectric cell underlies and is substantially vertically aligned with its corresponding port, a light source, means for mounting said light source laterally above said conveyer means, each photoelectric cell receiving and activated by light from said light source except when said pastry blocks light to said photoelectric cell, an individual shaft having a beveled edge at the end thereof for each port moveable between a port opening and a port closing position whereby the beveled edge of said shaft seats in the respective port to thereby seal the port, biasing means for biasing each of said shafts to the port opening position, a different one of a plurality of first means associated with respective ones of said shafts and responsive to an electric current for moving the respective shaft to port closing position, and means for connecting each photoelectric cell to the first means associated with its corresponding port whereby said shaft is caused to move to port closing position by the associated first means when the particular photoelectric cell receives light and said shaft is caused to move to port opening position when said particular photoelectric cell is blocked by said pastry.

3. Apparatus for applying fluid to pastry, comprising a longitudinally extending and moving light transmitting conveyer for conveying said pastry thereon, a frame having lateral arms respectively above and below said conveyer, a plurality of laterally spaced light sensitive means on one arm opposite the path of movement of said pastry for producing an electric current when light rays impinge thereon, a light source on the other arm operative to produce a beam of light emanating therefrom, each light sensitive means receiving and activated by light from said light source except when said pastry blocks light to said light sensitive means, first means for adjusting the effective width of the beam of light from said light source longitudinally of said conveyer, fluid dispensing means above said conveyer adjacent the path of light, said fluid dispensing having laterally spaced bottom fluid outlet ports in one to one correspondence to said light sensitive means, each port overlying and substantially vertically aligned with its corresponding light sensitive means, an individual valve for each port moveable between port opening and port closing positions, and electro-mechanical means for coupling each light sensitive means and the valve of its corresponding port for moving said valve to port opening position when light to said light sensitive means is blocked by said pastry and to said port closing position when the position of said pastry permits said light sensitive means to receive light.

4. A device as defined in claim 3 wherein said first means comprises a first shutter rotatable about said light source and a second shutter rotatable with respect to said light sensitive means for selectively covering portions of the light receiving surface of said light sensitive means, and means for maintaining said first and second shutters in predetermined positions.

5. In a device for applying icing to pastries, a longitudinally extending and moving light transmitting conveyer for conveying said pastries thereon, a frame having lateral arms respectively above and below said conveyer, a plurality of laterally spaced light sensitive means on one arm opposite the path of movement of said pastry responsive to a beam of light for producing an electric current, a light source on the other arm for supplying a beam of light, each light sensitive means receiving and activated by light from said light source except when said pastry blocks light to said light sensitive means, fluid dispensing means adjacent the path of light, said fluid dispensing means having laterally spaced bottom icing outlet ports in one to one correspondence to said light sensitive means, each port overlying and substantially vertically aligned with its corresponding light sensitive means, an individual shaft for each port moveable between port opening and port closing positions, a different spring associated with each shaft for biasing said shaft to said port opening position, and a solenoid connected to each light sensitive means and the shaft of its corresponding port for moving said shaft to port closing position when the position of said pastry permits said light sensitive means to receive light and for allowing said shaft to move to port opening position when light to said light sensitive means is blocked by said pastry.

6. A device for applying icing to pastries comprising, in combination, light transmitting conveyer means for conveying the pastries in a predetermined path, storage means for containing the icing which is to be applied to the pastries, means mounting said storage means laterally above said path, said storage means having a plurality of laterally spaced ports in the bottom wall thereof for dispensing the icing therethrough, a light source operative to produce a beam of light emanating therefrom, means for mounting said light source laterally above said conveyer means, a plurality of laterally spaced photoelectric cells in one to one correspondence with said plurality of ports, means for moveably mounting said photoelectric cells laterally below said conveyer means whereby said photoelectric cells are rotatable with respect to said light source, each photoelectric cell receiving and activated by light from said light source except when said pastry blocks the light to said photoelectric cell, a first shutter rotatable about said light source for varying the width of the light beam from said light source longitudinally of said conveyer, a second shutter rotatable about the light receiving surfaces of said photoelectric cells for varying the effective width of the beam of light longitudinally of said conveyer received by said photoelectric cells, means for fixing said first and second shutters in predetermined positions, a different one of a plurality of shafts each having a beveled edge at the end thereof for each port moveable into seating engagement with the associated port, biasing means associated with each of said shafts for biasing said shafts out of seating engagement with the respective port to allow the icing to flow through the respective port, an individual solenoid associated with each shaft for moving said shaft into seating engagement with the associated port when said solenoid is energized, means for connecting each photoelectric cell and the solenoid associated with its corresponding port whereby said solenoid is energized when the position of the pastry permits the photoelectric cell to receive light and said solenoid is de-energized when the pastry blocks the associated photoelectric cell.

References Cited by the Examiner

UNITED STATES PATENTS

| | | | |
|---|---|---|---|
| 2,855,740 | 10/1958 | Noland et al. | 198—37 |
| 2,855,891 | 10/1958 | Schmied | 118—2 |
| 3,013,445 | 12/1961 | Enssle | 188—2 X |
| 3,029,774 | 4/1962 | Nameyi-Katz | 118—2 |

DANIEL BLUM, *Primary Examiner.*